United States Patent [19]

Farhangi et al.

[11] Patent Number: 4,841,513
[45] Date of Patent: Jun. 20, 1989

[54] SEQUENTIAL BUFFER DEVICE

[75] Inventors: Hassan Farhangi; Johan W. M. E. Konings, both of Eindhoven, Netherlands

[73] Assignee: U.S. Philips Corporation, New York, N.Y.

[21] Appl. No.: 57,883

[22] Filed: Jun. 1, 1987

[30] Foreign Application Priority Data

Jun. 4, 1986 [NL] Netherlands ............... 8601437

[51] Int. Cl.⁴ .............................. G11B 5/02
[52] U.S. Cl. ................................... 369/59
[58] Field of Search .................... 369/47–49, 369/59

[56] References Cited

U.S. PATENT DOCUMENTS 4,672,597 6/1987 Yamazaki et al. ............ 369/59
4,736,352 4/1988 Satoh et al. .................. 369/59

Primary Examiner—Vincent P. Canney
Attorney, Agent, or Firm—Algy Tamoshunas

[57] ABSTRACT

A sequential buffer device for connection to a serially readable memory. The device has an input for serially receiving successive data frames, which frames contain user data, error detection data and error correction data in a predetermined pattern; a random access memory which is connected to the input in order to store the data of at least one frame received in a byte-wise first write operation, under the control of a byte-wise incrementable address counter; a cyclically operational error detection device which is connected to the input in order to execute an error detection on the basis of the error detection data in a frame received; an error correction device which is bidirectionally connected to the random access memory in order to localize and correct an error under the control of the error correction device and on the basis of the error correction data in the frame; and a first-in-first-out (FIFO) memory having a capacity which equals at the most the capacity of the random access memory. A data input which is connected to a data output of the random access memory in order to execute, in synchronism with the first read operation, a first write operation for writing data from the random access memory into the FIFO memory. The FIFO memory also has a data output for performing a second user read operation asynchronously with respect to the first read-out operation, in order to read data from the FIFO memory.

7 Claims, 1 Drawing Sheet 4,841,513

SEQUENTIAL BUFFER DEVICE

BACKGROUND OF THE INVENTION

1. Field of The Invention

The invention relates to a sequential buffer device for connection to a player for an optically readable memory disc, which player includes error protection members for data originating from the disc as well as reconfiguration members for presenting data elements of successive data frames on a serial output at a predetermined, uniform speed.

2. Description of the Related art

A memory disc of this kind is known as a "Compact disc" and serves for the storage of high-quality audio information. For the correction of incorrect bits, the data on the disc is stored according to two cross-interleaved Reed-Solomon codes. Random errors as well as error bursts can thus be corrected. In rare cases the correction will not be successful and a concealment strategy which is permissible for audio information is adopted, for example replacement of an incorrect value by an interpolated value.

It has been recognized that a disc of this kind can also be attractively used for the storage of a variety of other information, for example computer programs or dictionaries. In some cases, such a concealment strategy will then not make sense. However, the reliability of given information must still be higher than can be achieved by means of the discribed codes. To this end, a previously published system utilizes a so-called third layer of error protection which is based on so-called frames.

A frame may be composed of successively 12 bytes of synchronization data, 4 bytes of header data, 2048 bytes of user data and finally 288 bytes of inter alia error detection and error correction data. For a detailed description of the encoding and decoding of data on such a CD ROM reference is made to published British Patent Application No. 2,156,555.

A single disc of such a CD ROM offers a storage capacity of 600 Mbytes; its access time is also very short. Moreover, a CD ROM can be manufactured comparatively simply by means of the same equipment as used for the manufacture of audio Compact Discs, so that the cost of the CD ROM may be low. The player for a CD ROM may also be inexpensive, because such a player can have substantially the same construction as the CD players for audio applications which are already being manufactured in large numbers at low cost. One of the components thereof will be absent or inoperative, i.e., the digital-to-analog converter for forming a continuous audio output signal. Such a CD audio player supplies a data stream at a constant speed by way of a feedback mechanism to the disc drive. A similar storage format has already been proposed as a CD ROM for the storage of erasable and/or modifiable information. Alternatively, frames may alternately contain such error protection information. For the sake of brevity, all such storage formats will be referred to hereinafter as CD ROM. A common property thereof consists in that the third layer of error protection information need only rarely be activated, because the vast majority of the errors is corrected by the two cross-interleaved Reed-Solomon codes.

An audio player comprises two important sub-systems. The first sub-system provides the demodulation from channel bits to code bits and the error protection by way of the two cross-interleaved Reed-Solomon codes. The second sub-system provides reconfiguration, so that the sequence of the digital signals corresponds to the time sequence of the audio signal to be reproduced. This second sub-system may also implement the concealment strategy. The output of the second sub-system is then connected to the digital-to-analog converter. Both sub-system supply streams of digital of information at a uniform speed. Theredfore, the frames as defined supra may be derived from one of the two outputs. Both methods have their own specific advantages. Connection to the first sub-system (and omission of the second sub-system) offers a reconfiguration member which is to be optimized for CD ROM. Connection to the second sub-system, sometimes results in a more flexible set-up, because a selection can be made between audio reproduction and the supply of data frames. Preferably the error protection for the third layer already takes place in the CD ROM player.

If the computer connected to the CD ROM player cannot take up the data read from the CD ROM at the same speed, or it an interruption occurs in the taking up of data, data is liable to be lost if the output of data by the CD player is not stopped in time. Such data output can be stopped in time by moving the laser pick-up device of the CD player back to the preceding track, but such an operation is also undesirable because such a movement is rather time-consuming inter alia because the data output must be synchronized again before the CD player can output data once more, fore example, because the correct header must be localized again.

SUMMARY OF THE INVENTION

It is the object of the invention to provide a solution to this problem which occurs notably when a CD ROM is used as serially readable memeory.

The invention provides a sequence buffer device, including a serial input for receiving successive data frames which contain user data and possibly error detection data and error correction data in a predetermined pattern (format), a random asccess memory (RAM) which is connected to the input in order to store the data of at least one frame received in a first, byte-wise write operation under the control of a byte-wise incrementable address counter, a clyclically operative error detection device which is also connected to the input in order to perform error detection on the basis of the error detection data in a frame received, an error correction device which is bidirectionally connected to the random access memory in order to localize and correct an error under the control of the error detection device and on the basis of the error correction data in the frame, and a first-in-first-out memory having a capacity which equals at the most the capacity of theh random access memory and comprising a data input which is connected to a data output of the random access memory for executing a first read and second write operation in synchronism with the first write operation in order to write data from the random access memory into the frist-in-first-out memory, and also comprising a data output for executing a user read operation asynchronously with respect to the first write operation in order to read data from the first-in-first-out memory.

The sequential buffer device in accordance with the invention offers major advantages when used in a CD ROM players as a result of the presence of the first-in-first-out memory. Each complete frame of the data output by the CD ROM disc at a fixed speed is byte-wise written being incremented by one by an address counter after each writing of byte. On the basis of the error detection data present in the frame, it is at the same time determined whether errors are present in the frame written into the memory. If this is not the case, immediately after the entire frame has been written into the memory the frame or a part thereof can be read for transport to the first -in-first-out-memory. The content of the latter memory can be byte-wise read by way of a user read operation by the computer connected to the CD player at a speed which is to be determined by the computer. As a result of the present of the first-in-first-out memory, the data output speed of the random access memory, being determined by the data output speed of the CD ROM, is uncoupled from the data take-up speed of the computer connected to the CD player, so that, within given limits, interruptions or delays in the data take-up speed thereof will not influence the data output of the random access memory, so that the CD ROM can output the data without interruptions.

If an error is detected in the frame written into the random access memory, such an error can be simply corrected by means of the error correction data present in the frame because the entire frame is stored in the memory, after which the frame can be completely or partly read for transfer to the first-in first-out memory. In the case of such error detection, usually an interruption occurs in the data output by the CD ROM disc to the period of time required for the corrrection of the error; this is because, when an error is detected, the laser pick-up is moved back to the preceding track on the CD ROM disc, so that data synchronization must be otained again after error correction.

When the capacity of the random access memory is greater than necessary for the storage of one frame, the risk that the correction will not be completed in time decrease as the capacity is greater. However, if the pick-up device must be moved back anyway, an interruption amounting one revolution period will occur. This period is in the range from 0.1 to 0.3 seoconds.

The use of the first-in first-out memeory also offers further advantages. When the data take- speed of the computer connected to the memory is considerably lower than the data output speed of the memory, the presence of the first-in-first-out memory still enables fast output of the data, i.e., to the first-in-first-out memrory. After that, the control device (the microcomputer) can execute other necessary calculations for the serial memory (house-keeping), the computer meanwhile reading the data from the first-in-first-out memory at its own speed. As a result, the number of times that the microcomputer must interrupt the data output by the serial memory is substantially reduced, so that the operation of the entire system is improved.

The first-in-first-out memory offers advantages also in the case of small differences between the data output speed of the memory and the data take-up speed of the computer. Thanks to the presence of said memory, a comparatively long interval can be created for internal calsulations in the memory between the output of successive series of bytes by the memory writing a series of bytes into the first-in first-out memory at the maximum speed and by reading such as series each time at the slightly lower take-up speed of the computer. Thus, the data output by the random access memory can be interrupted for a comparatively long period of time between the successive series, so that the micro-computer can perform internal calcualtions.

The sequential buffer device in accordance with the invention may offer advantages even when the data take-up speed of the connected computer is substantially higher than the data output speed of the serial memory (burst data). This is the case when the connected computer must cyclically serve a number of peripheral apparatus, including the memory. Without the sequential buffer deivce, such a system would have cycle period equal to the output period for one byte, in order to ensure that the computer will not miss any byte supplied by the memory. Using the sequential buffer device in accordance with the invention, the cycle period can be varied and increased to a maximum of M times to the output of a byte, M being equal to the capacity in bytes of the first-in-first-out memory The capacity in bytes of the first-in-first-out memory. can be chosen in accordance with the desired application. A large memory capacity can handle comparatively long interruptions in the data take-up and also enables the connection of a computer having a comparatively low data. take-upn speed. For applications involving a CD ROM, however, it has been found that a comparatively small storage capacity of a first-in-first-out memory, for example a capacity equal to one quarter of that of the random access memory or less, already leads to a significant decrease of the number of necessary intrruptions in the data output by the CD ROM due to an interruption in the data take-up by the connected computer.

The first-in-first-out memory is preferably constructed as a shift register, because such a memory can be simply controlled. For other applications, however, it may be desirable to construct the first-in-first-out memory as a second randon access memory, be it with adapted memory control. Such control is more complex than the necessary for a shift register, but the use of a random access memory offers the advantage that the integration thereof in an integrated circuit comprising the entire sequential buffer device may be simpler than the intergration of a shift register. In that case the random access memory as well as the first-in-first-out memory can be constructed using the same technology. Because of the necessary separation in time, the data must always be physically transferred to the first-in-first-out memory.In that case it may sometimes be necessary to provide a priority mechanism when a conflict may arise between the memory acess operations by the host computer and by the random access memory. Then latter is coupled to the data supply by the optical disc and should be granted priority. For the error correction, generally a complete frame should always be present in the random access memory.

BRIEF DESCRIPTION OF THE FIGURES.

The invention will be described in detail herein with reference to the accompanying diagrammatic drawings therein.

DESCRIPTION OF A PREFERRED EMBODIMENT.

Figure 1:
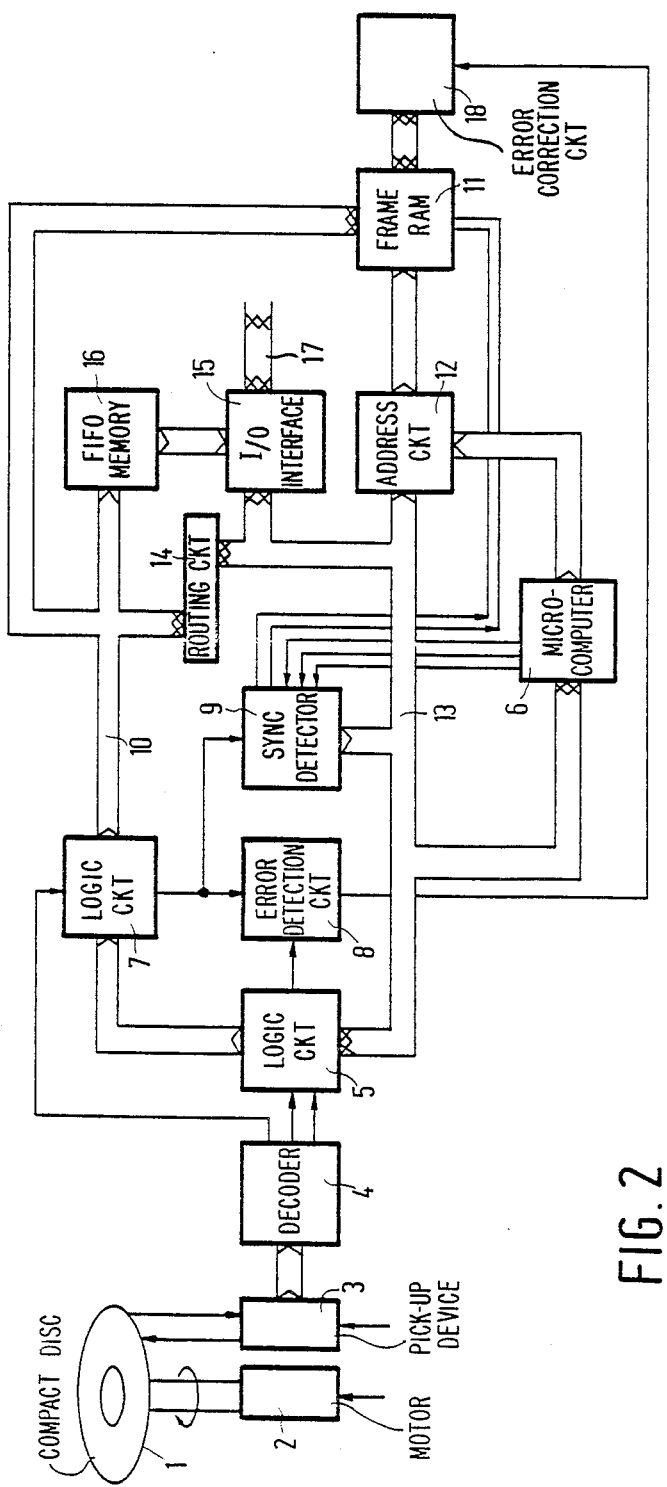
FIG. 1 shows a block diagram of a section of a CD ROM system which includes the sequential buffer device in accordance with the invention.

The reference numeral 1 in FIG. 1 denotes a CD ROM on which there are stored a large number of data frames having the descibed organization, that is to say sucessively 12 bytes of synchronisation data, 4 bytes of header data, 2048 bytes of user data, and 288 bytes of error detection and error correction data. Due to the cross-interleaved Reed-Solomon codes of the CD audio format, the data of a CD ROM frame is not consecutively stored without interruption. The CD disc 1 is driven in known manner by a motor 2 which is controlled by a servo system (not shown). A an optical pick-up device 3 which is aslo controlled by a servo system includes a laser source and detects the laser source light reflected by the CD. The data thus detected is applied to a decoder 4 whose construction is known per se, because such a decoder is also used in CD players for audio applications. For a description of the drive of CDs and the reading and decoding of the data present on such a CD, reference is made to J. Nijhof: "An integrated approach to CD players", Electronic components and applications, Vol 6, No. 4 1984, pages 209–221. The decoder 4 decodes the two cross-interleaved Reed Solmom codes. After the decoding operation, it produces an output signal having a so-called I²S format, which means that a clock signal (CL), a word select signal (WS), and a data signal (DA) are present on three respective output terminals. The I²S format is described in detail in Bristish Patent Application No. 2,154,833. The clock signal and the word selection signqal are coupled to a serial logic circuit 5 which is adapted to generate a number of internal timing signals and which also includes control and status registers which can be accessed by a microcomputer computer 6 which constitutes the central control unit of the entire CD player. The internal mode information supplied by the mirocomputer 6 and stored in the control register of the logic ciruit 5 is used to execute the various data routing and control functions, the results of which are updated in the satus register of the logic circuit 5. The data output signal of the logic circuit 5 is coupled to an input of a reconfiguration logic circuit 7. Logic curcuit necessary because the data series entering from the decoder 4 starts with the most-significant bit, due to the definition of the I²S format , while internal bus construction of the circuit shown to the right of the decoder 4 in FIG. 1 is adapted for a data series starting with the least-significant bit. The reconfiguration logic circuit provides the desired conversion.

The logic circuit 7 outputs the data in series to an error detection circuit 8 and to circuit 9 for the detection of the synchronization and header data in the data stream. The error detector 8 utilizes the error detection data in each frame by executing a cyclical redundancy code (CRC) check on each frame. This detection is performed very quickly, so that an indication correct/not correct is formed immediately after reception of the entire frame.

The circuit 9 is controlled by three signals supplied by the microcomputer, that is to say a write signal, a read signal and an address latch enable signal. When a given data frame is to be read on the basis of a used read instruction issued by an external computer (not shown) connected to a data bus 17, the circuit 9 continuously checks the incoming data stream for the present of 91 succesive bits having a given pattern, that is to say the synchronization data. This data is used for determining the beginning of a drain frame while at the same time header data following this synchronization is recorded for later user by the microcomputer 6. After synchronization has been established by the detection of the synchronization data, the circuit 9 only checks the header of the successive data frames in order to a determine whether indeed successive frames are read.

The data stream of a given frame which is output bytes-wise by the output of the reconfiguration circuit 7 is applied to a data bus 10 and written into a random access memory 11 afer a byte-wise read-before-write operation. The addressing of the memory locations in the memory 11 is controlled by an address circuit 12 which itself receives address data from the microcomputer 6 and which also receives control data from the control data bus 13. The data bus 13 is connected to the logic circuit 5, to the logic circuit 9, to an access routing circuit 14 which provides the routing of data via the data busses 10 and 13 in a customary manner, and to an input/output interface 15.

An entire frame can be written into the memory 11. When the error detection circuit 8 has not detected an error in the frame received, this frame (or a part thereof) can be byte-wise read from the memory 11, immediately after the last byte thereof has been written therein, for transfer to a first-in-first-out memory 16 which consists of an number of registers which together are capable of storing 64 bytes in the present embodiment; at the same time the bytes of the next frame are byte-wise written into the memory 11 again at the memory location bearing the same address. The manner of 64 bytes is attractive in view of the organization of a variety of computers for which this number represents a basic unit of information. On the other hand, another capacity, for example 32 or 128 bytes, may also be advantageous. It is substantially smaller than the capacity required for one frame. A capacity amounting to ¼ frame is also advantageous but more expensive (i.e. approximately 500 bytes). Even very small first-in-first-out memories may be advantageous, for example memories having a capacity of 16, 8 or even 4 bytes.

To the output of the memory 16 there is connected an input/output interface 15 which can communicate. via a data bus 17, with a external computer (not shown). The interface 15 can communicate with this computer, for example via the standardized SCSI bus protocol (described in "SCSI Guidebook"; Adaptive Data Systems Inc., Pomona, Cal., USA). The bytes of the frame written into the memory 16 can be read from the memory, via a user read instruction issued by the external computer, at a speed which need not correspond to the speed at which the data is Written into the random access memory 11. Thus uncoupling is achieved between the data output speed of the CD ROM 1 and the data take-up speed of the computer connected to the CD ROM player. In the case of possibly condflicting access operations by the random access memory and by the computer, it will sometimes be necessary to grant priority to the former; this is because the priority is determined by the uniform supply of data from the serial memory priority. Arbitration mechanisms of this kind are known per se. For the sake of simplicity they are not shown in the figure. In given circumstances the error correction components may also be involved in the priority arrangement. Their priority is lower than that of the random access memory. The priority with respect to the computer can usually still be chosen.

As has already been described, when the error detection device 8 has detected an error in a frame read from the CD ROM, another mode is adopted in that the pick-up device 3 is moved back to the preceding track. The error correction circuit 18 which is shown in FIG.

1 and which is coupled to the random access memory 11 can correct the error in the frame under the control of an output signal of the error detection circuit 8 and on the basic of the error correction data presetn in the relevant frame. Subsequently, the frame can be output to the external computer via the first-in-first-out memory 16 and the input/output interface 15. After that the circuit 9 will again have to search for synchronization data in the incoming data stream in order to establish the necessary synchronization. This operation can be performed most quickly by jumping to the preceding track immediately after the detection of an error. Using the above method. reading can be carried out at a very high speed until an error is detected again in a frame received. However, it has been found that such errors are not very frequent in practice.

Figure 2:
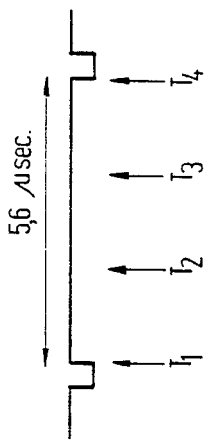
FIG. 2 shows a time diagram illustrating the control of the sequential buffer device.

The CD ROM is driven at such a speeed that 75 data frames are read per second. Each data frame contains 2352 bytes, so that every byte has duration of 5.6 µs. FIG. 2 showns a period of 5.6 µs during which, therefore, one byte of the CD ROM is read. During this period, the following control instructins are applied to the chain shown in FIG. 1 at four successive instants which are denoted by $T_1$, $T_2$, $T_3$ and $T_4$, respectively.

$T_1$: increment the address of the random access memory by one;

$T_2$: check whether there is room in the first-in first-out memory; if yes continue with $T_3$; if no, stop the writing of date into random access memory, thus interrupting the read cycle;

$T_3$: read the content of the address of the memory and write it into the first-in-first-out memory;

$T_4$: fill the address of the randomm access memory with the next byte originating from the CD ROM.

It is to be noted that the sequential buffer device in accordance with the invention can be also be advantageously used when the frame does not contain error detection and error correction data. If this is the case, the header of the frame contains relevant information and the error detection circuit 8 and the error correction circuit 18 can be de-activated on the basis thereof. Evidently, if no error correction need take place, it will not be necessary either to write an entire frame into the memory 11. It may also be that a succession of frames which alternately contain such error protection data is presented.

Finally, the sequential buffer device in accordance with the invention is not necessarily included in a CD ROM player. If is also possible to connect the chain shown to the right of the decoder 4 in FIG. 1 as a separate unit to for example a CD player for audio applications which comprises a separate output on which the signals in the I2S format on the output of the decoder 4 are present.

What is claimed is:

1. A sequential buffer device for connection to a player for an optically readable memory disc, which player includes error protection members for data originating from the disc was well as reconfiguration members for presenting data elements of successive data frames on a serial output at a predetermined, uniform speed, which sequential buffer device comprises: a serial input coupled to said serial output of said player to receive successive data frames which contain user data and possibly error detection data and error correction data in a predetermined pattern a random ; access memory connected to input for storing the data of at least one frame received in a first byte-wise write operation under the control of a byte-wise incrementable address counter ; a cyclically operative error detection device also connected to said serial input to perform error detection on the basis of the error detection data in a received frame; an error correction device bidirectionally connected to the random access memory to localize and correct an error under the control of the error detection device and on the basis of the error correction data in the frame ; and a first-in-first-out memory having a capacity at most equal to the capacity of the random access memory and having a data input which connected to a data output of the random access memory for executing a first read and a second write operation in synchronism with said first write operation in order to write data from the random access memory intop the first-in-first-out memory said first-in-first-out memory also having a data output for executing a user read operation asynchronously with respect to said first write operation in order to read out data from said first-on-first-out memory.

2. A sequential buffer device as claimed in claim 1, characterized in that the capacity of the random access memory equals the amount of data contained in a frame, the first read operation being a read-before-write operation.

3. A sequential buffer device as claimed in claim 1 or 2, characterized in that first-in-first-out memory is a shift register.

4. A sequential buffer device as claimed in claim 3, characterized in that the capacity of the first-in-first-out memory is substantially smaller than the amount of user data present in a frame.

5. A sequential buffer device as claimed in claim 4, characterized in that the shift register has a storage capacity of 64 bytes.

6. A sequential buffer device as claimed in claim 1, characterized in that the absence of error detection data and error correction data in a frame, the error detection device and the error correction device are de-activated 7. A sequential buffer device as claimed in claim 1 or claim 2 characterized in that the first-in-first-out memory comprises a priority mechanism for granting priority to the second write operation in the case of coincidence of a permissible second write operation

* * * * *